April 16, 1940.  C. G. WOOD  2,197,232

CLUTCH PLATE

Filed Jan. 18, 1936  2 Sheets-Sheet 1

INVENTOR.
Clarence G. Wood
BY Horace B. Fay
ATTORNEY.

April 16, 1940.                  C. G. WOOD                      2,197,232
                                CLUTCH PLATE
                         Filed Jan. 18, 1936              2 Sheets-Sheet 2

INVENTOR.
CLARENCE G. WOOD
BY Horace B. Fay
ATTORNEY.

Patented Apr. 16, 1940

2,197,232

UNITED STATES PATENT OFFICE 2,197,232

CLUTCH PLATE

Clarence G. Wood, Cleveland Heights, Ohio

Application January 18, 1936, Serial No. 59,719

3 Claims. (Cl. 192—113)

The present invention relates to an improved construction for those parts of a power transmitting mechanism which consist of parallel circular surfaces, known as driving and driven plates, which are pressed into engagement and by virtue of such pressure and the friction of surface-to-surface contact, become locked to each other and revolve as a unit, thereby effecting power transmission. More particularly, the invention is applicable to the construction of the driving or pressure plate and the driven plate of a clutch assembly as used in modern internal combustion engine practice.

The general object and nature of the invention is to provide a clutch plate construction whereby a metallic friction facing member may be employed as distinguished from the prior use of friction facing members composed of non-metallic heat resistant material in which asbestos, mineral wool or the like is a component element. The construction embodying the principle of the present invention also includes means for dissipating the heat of friction generated by the engagement of the clutch plate surfaces, such means comprising air cooling ducts adjacent the clutch plate facing through which air is caused to circulate by centrifugal force arising from the rotation of the clutch plates. Since a metallic friction facing member possesses a relatively greater resistance to wear than a non-metallic one, and since a metallic facing member generally possesses a much greater thermal conductivity than the non-metallic composition material heretofore used for the frictional engagement of the clutch plates, my present invention possesses the advantages not only of increased wear resistance but also of greater and more dissipation of the heat of friction, resulting in a clutch plate construction of longer life, efficiency and durability.

To the accomplishment of the foregoing and related ends, said invention, then, consists of the means hereinafter fully described and particularly pointed out in the claims.

The annexed drawings and the following description set forth in detail certain structure embodying the invention, such disclosed means constituting, however, but one of various structural forms in which the principle of the invention may be used.

In said annexed drawings:

Fig. 4 is a perspective view of the alternately bent strip member which is adapted to be assembled between the plate shown in Fig. 3 and the other plate of the clutch driven plate of which

Figure 1:
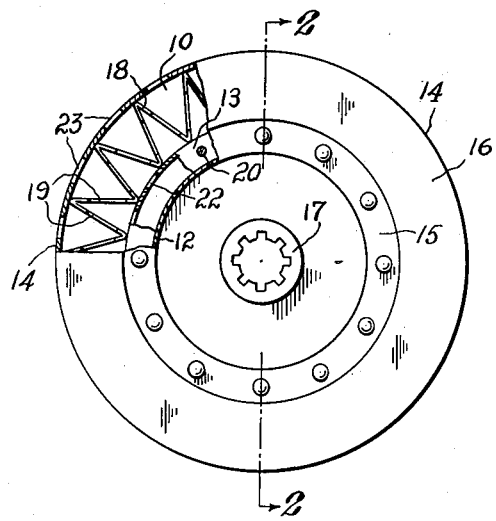
Fig. 1 is a view, partly in elevation, and partly in section, of a clutch driven plate embodying the invention.
Figure 2:
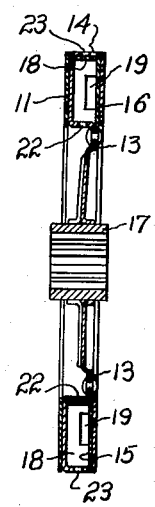
Fig. 2 is a cross-sectional view of the clutch plate taken on the line 2—2 of Fig. 1.
Figure 7:
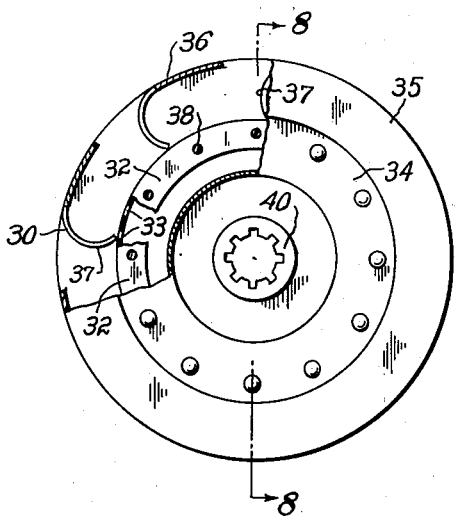
Fig. 7 is a view similar to Fig. 1, but showing an alternative form of construction.
Figure 8:
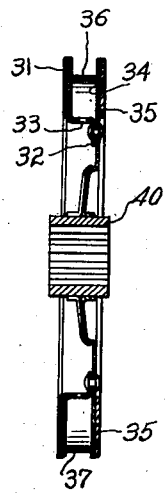
Fig. 8 is a cross-sectional view, taken on the line 8—8 of Fig. 7;

Referring to Figs. 1 to 6 inclusive of the drawings, the clutch driven plate therein shown comprises a plate 10 which carries a metallic facing 11 which may be fused thereon, and has a central opening 12 adjacent to which there is a flange 13 which lies in a radial plane spaced axially from the body of the plate 10. Around the outer periphery of the plate 10 there is a transverse flange 14 whose free edge lies in the same plane as the face of the flange 13. The plate 10 constitutes one of the outer elements of the clutch driven plate and is adapted to be assembled with the plate 15 which also carries a metallic facing 16 and a splined hub 17. The hub 17 is of course engaged by the driven shaft (not shown) in a clutch assembly. When the plate 10 is assembled with the plate 15, the flange 13 and the free edge of the flange 14 of the first-named plate will contact with the face of the plate 15. Thus, there will be a space between the plates 10 and 15 which is occupied by the alternately bent strip member 18. The strip member 18 in turn has a plurality of recesses 19 which are for the purpose of providing a series of air passages. The plate 10 is secured to the plate 15 by means of rivets passing through the holes 20 and 21 in their respective plates. Slotted openings 22 are provided in the web which connects the flange 13 with the plate 10 and there are also slotted openings 23 in the outer flange 14 of the plate
10. Thus when the component parts 10, 15 and 18 are assembled together there results a clutch driven plate assembly having two friction facing surfaces 11 and 16 and means for the centrifugal conduction of cooling air consisting of the vanes formed by the faces of the alternately bent strip member 18. During rotation of the clutch driven plate thus assembled the circulating air enters through the openings 22 and passes out through the openings 23.

The alternately bent strip member can be conveniently formed from a piece of strip stock from which the recesses 19 are first punched, the stock formed into alternate bends of circular contour and the ends of the stock then welded together. The strip member 18 not only provides a series of vanes for the centrifugal conduction of air but also serves as a stiffening element between the spaced apart surfaces of the plates 10 and 15.

Figure 3:
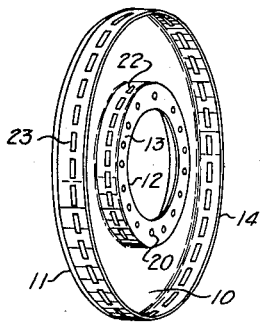
Fig. 3 is a perspective view of a part of the clutch driven plate shown in Figs. 1 and 2.
Figure 4:
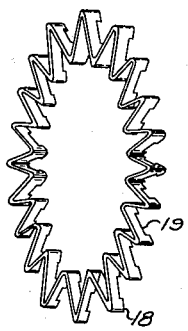
Figure 5:
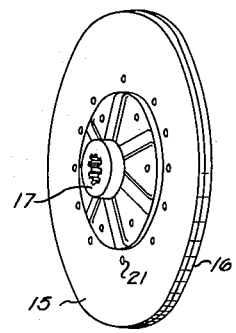
Fig. 5 is a perspective view.
Figure 6:
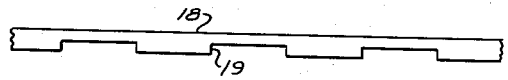
Fig. 6 is a fragmentary development of the strip member shown in Fig. 4.
Figure 9:
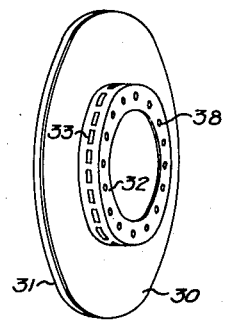
Fig. 9 is a perspective view of one of the clutch plates of that form of the invention shown in Figs. 7 and 8.
Figure 10:
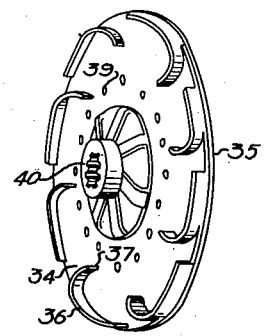
Fig. 10 is a perspective view of the other clutch plate of Figs. 7 and 8.

In the alternative form of construction shown in Figs. 7 to 10 inclusive, a plate 30 having a metallic facing 31, has a flange 32 similar to the flange 13 of the plate illustrated in Fig. 3, and has slotted openings 33 in the web which connects the flange 32 with the body of said plate. The plate 30 is adapted to be secured to the plate 34, which latter plate also has a metallic facing 35 and is mounted upon the splined hub 40. The plate 34 has a plurality of marginal strip portions 36 which are partially cut from the outer edge of the plate and bent at right angles from the plane thereof and with their inner ends 37 spot welded or otherwise secured to the inner face of the plate 34. These portions 36 thereby form curved vanes extending outwardly towards the periphery of the plate 34 and serve the purpose of centrifugally impelling air through the space between the plates 30 and 34, thereby obtaining the desired cooling effect. The plates 30 and 34 are secured together, the flange 32 contacting the face of the plate 34, by means of rivets passing through the holes 38 and 39 of the respective plates.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. In a clutch plate assembly, the combination of a metal plate, said plate having a flange disposed in a radial plane and spaced inwardly from the peripheral edge of the plate as well as axially from the body thereof, a second plate disposed adjacent said first plate and secured to the flange of the latter, said flange being connected to the body of the first plate by a web having a multiplicity of openings for the passage of air through said web, and a plurality of sheet metal vanes disposed in the space between said web and the peripheral edges of the plates, said vanes defining a plurality of passages for the centrifugal conduction of air between said plates during the rotation of said clutch plate assembly.

2. In a clutch plate assembly, the combination of a metal plate, a second plate spaced axially from one of the faces of said first plate, a strip member disposed in the space between said plates, said strip member being formed in alternate bends and having its surfaces disposed normally to the faces of said plates, and recesses in said strip member whereby air passages are formed for the centrifugal conduction of air between said plates during the rotation of said clutch plate assembly.

3. In a clutch plate assembly, the combination of a metal plate, said plate having a flange disposed in a radial plane and spaced inwardly from the peripheral edge of the plate as well as axially from the body thereof, a second plate disposed adjacent said first plate and secured to the flange of the latter, said flange being connected to the body of the first plate by a web having a multiplicity of openings for the passage of air through said web, said second plate having a plurality of strips at the peripheral edge thereof, portions of which are curved inwardly toward the axis of said second plate, thereby providing curved vanes which serve to centrifugally impel air through the space between said plates.

CLARENCE G. WOOD.